US011211979B2

(12) United States Patent
Chang et al.

(10) Patent No.: US 11,211,979 B2
(45) Date of Patent: Dec. 28, 2021

(54) METHOD AND APPARATUS FOR CONTROLLING TRANSMISSION POWER IN WIRELESS COMMUNICATION SYSTEM

(71) Applicant: Samsung Electronics Co., Ltd., Suwon-si (KR)

(72) Inventors: Sanghyun Chang, Seoul (KR); Changhyun Baik, Suwon-si (KR); Kilsik Ha, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/487,537

(22) PCT Filed: Feb. 20, 2018

(86) PCT No.: PCT/KR2018/002068
§ 371 (c)(1),
(2) Date: Aug. 21, 2019

(87) PCT Pub. No.: WO2018/155882
PCT Pub. Date: Aug. 30, 2018

(65) Prior Publication Data
US 2019/0372633 A1    Dec. 5, 2019

(30) Foreign Application Priority Data

Feb. 21, 2017    (KR) .................. 10-2017-0022785

(51) Int. Cl.
*H04W 52/02*    (2009.01)
*H04B 7/0456*    (2017.01)
(Continued)

(52) U.S. Cl.
CPC ......... *H04B 7/0465* (2013.01); *H04B 7/0617* (2013.01); *H04B 7/0639* (2013.01);
(Continued)

(58) Field of Classification Search
CPC ... H04B 7/00; H04B 7/02; H04B 7/04; H04B 7/06; H04B 7/0456; H04B 7/0617;
(Continued)

(56) References Cited

U.S. PATENT DOCUMENTS 8,838,051 B1    9/2014    Su et al.
2003/0190924 A1    10/2003    Agashe et al.
(Continued)

FOREIGN PATENT DOCUMENTS

KR    10-2017-0082006 A    7/2017
WO    03/088521 A2    10/2003
WO    2014/201157 A1    12/2014

OTHER PUBLICATIONS

Ericsson: "On power control in NR and MU-MIMO", 3GPP Draft; R1-1612356 On Power Control in NR and MU-MIMO, 3rd Generation Partnership Project (3GPP), Mobile Competence Centre; 650, Route Des Lucioles ; F-06921 Sophia-Antipolis Cedex ; France, vol. RAN WG1, No. Reno, USA; Nov. 14, 2016-Nov. 18, 2016 Nov. 13, 2016 (Nov. 13, 2016), XP051176305, Retrieved from the Internet: URL:http:/www.3gpp.org/ftp/Meetings_3GPP_SYNC/RAN1IDocsl, Nov. 13, 2016.
(Continued)

*Primary Examiner* — Shawkat M Ali
(74) *Attorney, Agent, or Firm* — Jefferson IP Law, LLP (57) ABSTRACT

The present disclosure relates to a communication technique converging a 5G communication system with IoT technology to support a higher data transmission rate compared to a 4G system. The present disclosure can be applied to intelligent services (for example, smart homes, smart buildings, smart cities, smart cars or connected cars, healthcare, digital education, retail, security- and safety-related services) based on 5G communication technology and IoT-related technology. The present invention relates to a method for controlling transmission power of a terminal in a wire-
(Continued)

less communication system. More particularly, a method for the terminal according to one embodiment of the present invention, comprises the steps of: receiving a power control command from a base station; determining a power control value according to the power control command; determining power control information according to the power control command: determining the number of RF chains required for power control based on the power control information: and controlling the transmission power using a beam pattern according to the determined number of RF chains.

12 Claims, 6 Drawing Sheets

(51) Int. Cl.
*H04B 7/06* (2006.01)
*H04W 52/34* (2009.01)
*H04W 72/04* (2009.01)

(52) U.S. Cl.
CPC ....... *H04W 52/0206* (2013.01); *H04W 52/34* (2013.01); *H04W 72/0453* (2013.01)

(58) Field of Classification Search
CPC ......... H04B 7/0639; H04L 1/02; H04L 27/00; H04L 29/04; H04W 28/02; H04W 52/02; H04W 52/34; H04W 52/42; H04W 52/0206; H04W 72/04; H04W 72/042; H04W 72/0453
USPC ........ 370/252, 329; 375/219, 260, 267, 295, 375/316
See application file for complete search history.

(56) References Cited

U.S. PATENT DOCUMENTS

| | | |
|---|---|---|
| 2005/0096058 A1 | 5/2005 | Warner et al. |
| 2005/0260954 A1* | 11/2005 | Hamalainen ......... H04B 7/0634 455/101 |
| 2009/0196372 A1 | 8/2009 | Zhang et al. |
| 2010/0208633 A1* | 8/2010 | Takano ................ H04B 7/0617 370/310 |
| 2013/0089044 A1 | 4/2013 | Park et al. |
| 2014/0044044 A1* | 2/2014 | Josiam .................. H04B 7/063 370/328 |
| 2014/0185481 A1* | 7/2014 | Seol ...................... H04W 52/24 370/252 |
| 2015/0282154 A1 | 10/2015 | Yavuz et al. |
| 2017/0195855 A1 | 7/2017 | Na et al. |
| 2018/0048360 A1* | 2/2018 | Athley .................. H04W 8/082 |
| 2019/0052331 A1* | 2/2019 | Chang .................. H04B 7/0619 |
| 2019/0327695 A1* | 10/2019 | Ren ....................... H04W 52/54 |

OTHER PUBLICATIONS

Qualcomm Incorporated: "Determination of UL beams through reciprocity", 3GPP Draft; R1-1702608, 3rd Generation Partnership Project (3GPP), Mobil Competence Centre; 650, Route Des-Lucioles ; F-06921 Sophia-Antipolis Cedex; France, vol. RAN WG1, No. Athens, Greece; Feb. 13, 2017-Feb. 17, 2017 Feb. 12, 2017 (Feb. 12, 2017), XP051209761, Retrieved from the Internet: URL:http://www.3gpp.org/ftp/Meetings_3GPP_SYNC/RAN1/Docs/, Feb. 12, 2017.
European Search Report dated Dec. 18, 2019, issued in European Patent Application No. 18758391.9.

* cited by examiner

METHOD AND APPARATUS FOR CONTROLLING TRANSMISSION POWER IN WIRELESS COMMUNICATION SYSTEM

TECHNICAL FIELD

The disclosure relates to a method and an apparatus for controlling a transmission power of a signal being transmitted to a base station in a wireless communication system.

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System." Implementation of the 5G communication system in ultrahigh frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G communication system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) where distributed entities, such as things, exchange and process information without human intervention. The Internet of everything (IoE) technology, which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by techniques of beamforming, MIMO, and array antennas, which correspond to 5G communication technologies. More specifically, the MIMO is an abbreviation of multiple-input multiple-output, and it means a method capable of improving transmitted and received data efficiencies through adoption of multiple transmission antennas and multiple reception antennas in contrast with the technology using one transmission antenna and one reception antenna. That is, the MIMO is a technology to increase the capacity or to improve the performance using multiple antennas in a transmitter or a receiver of a wireless communication system. Because the MIMO technology can improve the data transmission speed in a specific range or it can increase the system range with respect to the specific data transmission speed, it is considered as the next-generation mobile communication technology that can be widely used for mobile communication terminals and repeaters.

Meanwhile, in performing communication with a base station in a wireless communication system, a device such as a terminal can determine a transmission power of a signal transmitted to the base station in accordance with a distance between the device and the base station.

DISCLOSURE OF INVENTION

Technical Problem

The disclosure has been made in order to solve the above-described problems, and aspects of the disclosure are to provide a method and an apparatus by a terminal for controlling a transmission power using a beam pattern determined in accordance with a power control command received from a base station.

Solution to Problem

In an aspect of the disclosure in order to solve the above-described problems, a method by a terminal includes receiving a power control command from a base station; determining power control information in accordance with the power control command; determining the number of RF chains required for power control based on the power control information; and controlling the transmission power using a beam pattern in accordance with the determined number of RF chains.

In another aspect of the disclosure, a terminal includes a transceiver configured to receive a power control command from a base station; and a controller configured to determine power control information in accordance with the power control command, to determine the number of RF chains required for power control based on the power control information, and to control the transmission power using a beam pattern in accordance with the determined number of RF chains.

Advantageous Effects of Invention

According to the aspects of the disclosure, because the terminal (method) determines the number of RF chains that is proper to control the power, a wider power control range can be secured, and thus various pass losses can be compensated for.

MODE FOR THE INVENTION

In describing the disclosure, related well-known functions or configurations incorporated herein are not described in detail in case where it is determined that they obscure the subject matter of the disclosure in unnecessary detail. Further, terms to be described later are terms defined in consideration of their functions in the disclosure, but may differ depending on intentions of a user and an operator or customs. Accordingly, they should be defined on the basis of the contents of the whole description of the disclosure.

Further, in describing embodiments of the disclosure in detail, the primary subject matter of the disclosure can also be applied to other communication systems having similar technical backgrounds and channel types through slight modifications thereof in a range that does not greatly deviate from the scope of the disclosure by the judgment of those skilled in the art to which the disclosure pertains.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

In general, a device (hereinafter referred to as "terminal") such as a portable terminal may determine a transmission power of a signal transmitted to a base station in accordance with a distance between the device and the base station. For example, the terminal may measure the reception strength of a signal being received from the base station, and it may determine the strength of a signal to be transmitted to the base station in reverse proportion to the strength of the received signal. Further, in contrast with this, the terminal may receive a power control command transmitted from the base station, and it may determine the transmission power of the signal to be transmitted to the base station based on the power control command.

Hereinafter, in the description, a method for determining and controlling a transmission power will be described on the assumption that a terminal according to an embodiment of the disclosure receives a transmission control command from a base station.

Hereinafter, with reference to the accompanying drawings, a method and an apparatus by a terminal for controlling a transmission power according to an embodiment of the disclosure will be described.

Figure 1:
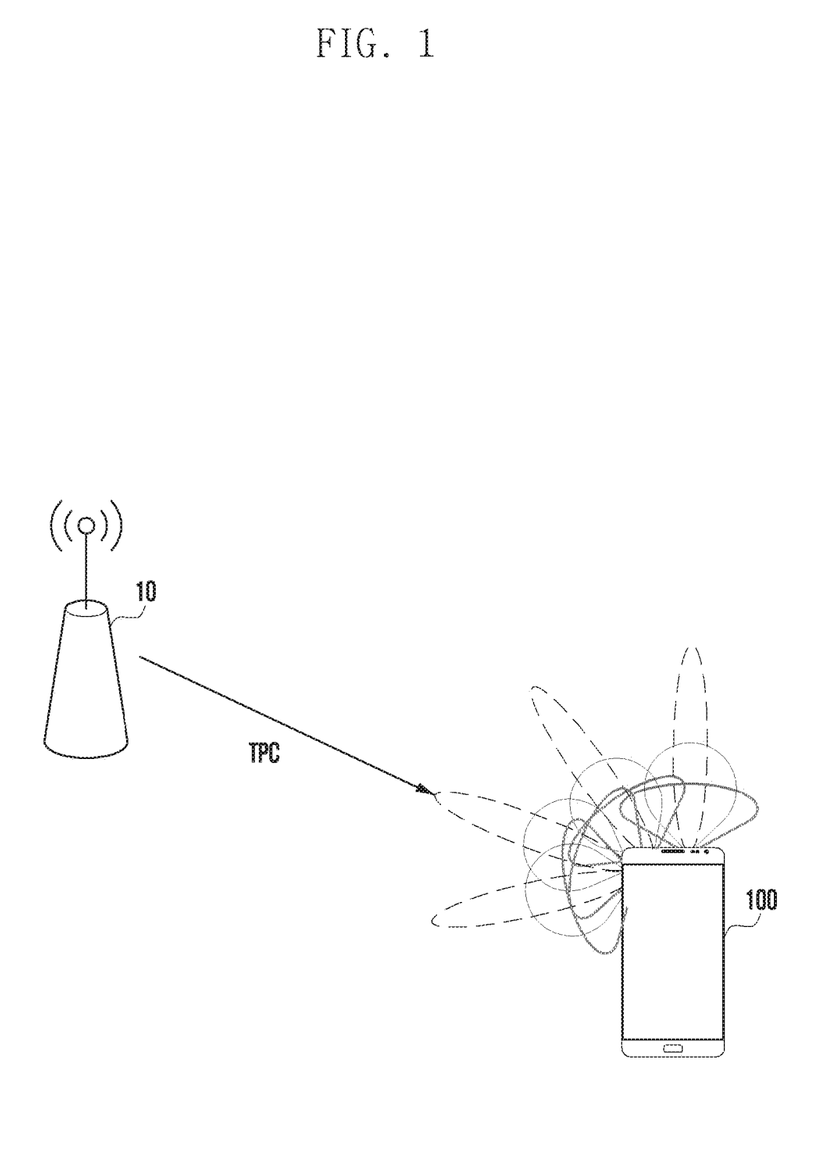
FIG. 1 is a conceptual diagram explaining a terminal and a base station performing transmission power control according to an embodiment of the disclosure.

FIG. 1 is a conceptual diagram explaining a terminal and a base station performing transmission power control according to an embodiment of the disclosure.

With reference to FIG. 1, a base station 10 according to an embodiment of the disclosure may transmit a message including a transmit power control (TPC) command to a terminal 100. Here, the power control command may include power control information for the terminal to transmit a signal with a transmission power of a proper level in accordance with a wireless channel state.

The terminal having received the power control command from the base station may control the transmission power in accordance with the power control information included in the power control command. In general, the terminal may adjust the power to be transmitted to the base station using a power amplifier connected to an antenna element. For example, the terminal may input an analog signal based on a power control value to a power amplifier to amplify the power as high as a specific gain, or it may input, to a digital-to-analog converter (DAC), digital data selected based on the power control value among pieces of digital data generated based on constellation and the degree of modulation, and it may input a signal output from the DAC to the power amplifier to amplify the power.

The terminal according to an embodiment of the disclosure may control the transmission power by selectively operating at least a part of a plurality of antenna elements included in the terminal. That is, as illustrated in FIG. 1, the terminal according to an embodiment of the disclosure may control the transmission power by forming various beam patterns using at least parts of the plurality of antenna elements in accordance with the power control command.

For this, the terminal according to an embodiment of the disclosure may be connected to at least parts of the plurality of antenna elements, and it determines the transmission power through determination of the number of RF chains for transferring signals to the at least parts of the antenna elements. In relation to this, more detailed embodiments will be described with reference to the accompanying drawings.

Figure 2:
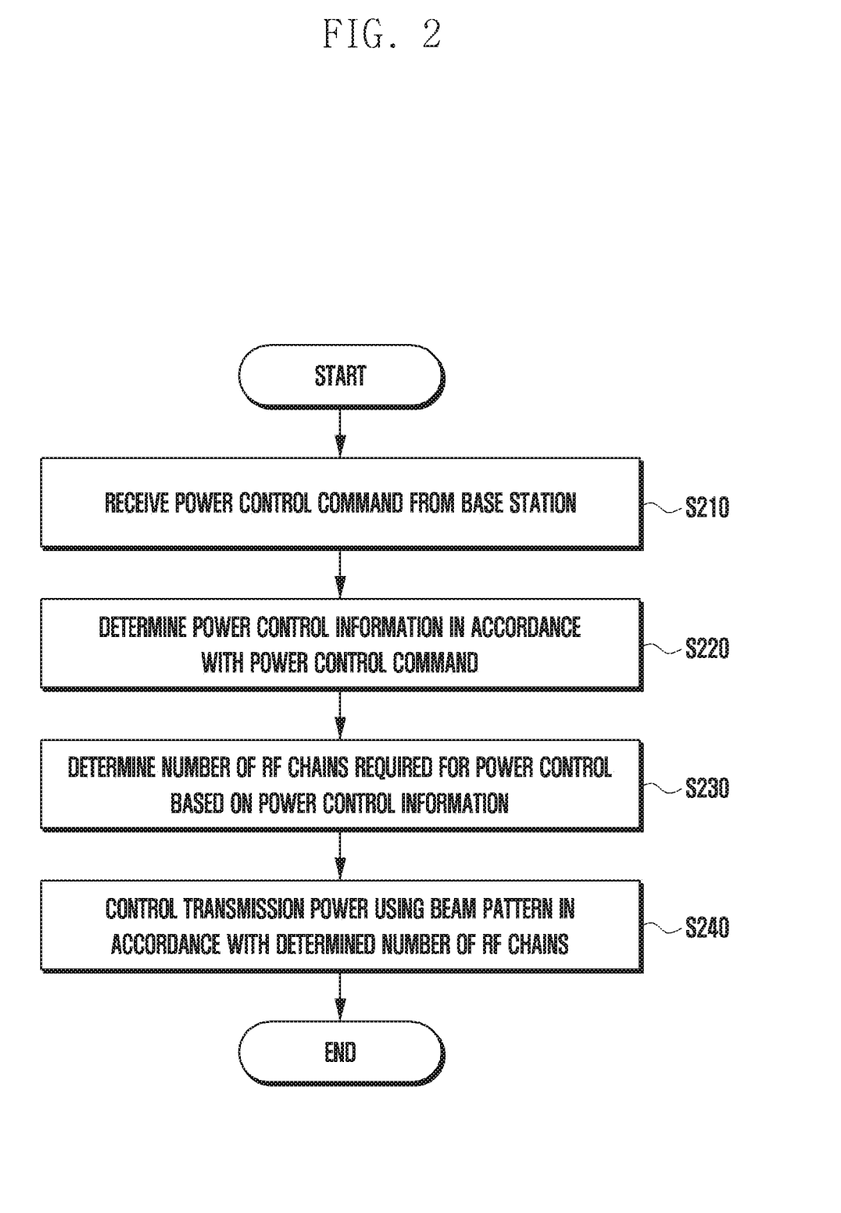
FIG. 2 is a flowchart illustrating a method by a terminal for controlling a transmission power according to an embodiment of the disclosure.

FIG. 2 is a flowchart illustrating a method by a terminal for controlling a transmission power according to an embodiment of the disclosure.

With reference to FIG. 2, the terminal according to an embodiment of the disclosure may receive the power control command from the base station (S210).

Here, the power control command may include power control information for making the terminal transmit a signal with the transmission power of a proper level in accordance with the wireless channel state, and for example, the power control command may be included in a radio resource control (RRC) message that is transmitted from the base station to the terminal. As an example, if the wireless channel state is not good, the base station may transmit the power control command to heighten the transmission power to the terminal, whereas if the wireless channel state is good, the base station may transmit the power control command to lower the transmission power to the terminal.

As described above, if the power control command is received, the terminal according to an embodiment of the disclosure may determine the power control information in accordance with the power control command (S220).

For example, the power control information may include information on the power level that should be adjusted in the transmission power for currently transmitting the signal. As an example, the power control information to be transmitted may include a specific power control value [dB]. In contrast with this, the terminal according to an embodiment of the disclosure may specify the power control value to be controlled through analysis of the power control information.

Further, the terminal according to an embodiment of the disclosure may determine the number of RF chains required for the power control based on the power control information (S230).

For example, the number of RF chains being operated may differ depending on the level of the transmission power to be controlled by the terminal. As an example, as the number of RF chains being operated is reduced to a half, the power adjustable range may be additionally secured by about 6 dB. In this case, whenever the number of RF chains is reduced to a half, the array gain of about 3 dB and the power amplifier gain of about 3 dB can be secured.

More specifically, if the terminal according to an embodiment of the disclosure includes 32 RF chains respectively connected to 32 antenna elements, the level of the transmission power value that can be increased during transmission of the signal can be further secured by about 6 dB in the case of operating 16 RF chains in comparison with that in the case of operating 32 RF chains. In this case, if 4 RF chains are operated, the power value of 18 dB in total can be additionally increased.

If the level of the power to be controlled in accordance with the power control information is high, the terminal according to an embodiment of the disclosure may determine a large number of RF chains to control the transmission power, whereas if the level of the power to be controlled is low, the terminal may determine a small number of RF chains to control the transmission power.

In this case, the terminal according to an embodiment of the disclosure may determine the number of RF chains corresponding to the power control information using a first lookup table. Here, the first lookup table may be a table in which the number of RF chains and data of a power control value by a power amplifier being controlled in accordance with the number of RF chains are mapped to each other corresponding to certain power control information. The first lookup table will be described later in more detail with reference to FIG. 4.

If the number of RF chains is determined as described above, the terminal according to an embodiment of the disclosure may control the transmission power using a beam pattern in accordance with the determined number of RF chains (S240).

Here, the beam pattern may mean the shape of a beam of which the beam width and the beam pattern gain are determined based on the number of RF chains and the transmission power value. For example, the beam pattern may have the beam shape of which the beam width is narrowed and the beam pattern gain is increased as the transmission power value and the number of RF chains are increased.

The terminal according to an embodiment of the disclosure may determine the beam pattern corresponding to the determined number of RF chains and the power control value, and it may transmit the signal using the determined beam pattern to control the transmission power.

In general, the terminal may control the transmission power using power amplifiers connected to the antenna. In this case, the maximum power level that can be controlled using the power amplifiers may be about 6 dB in consideration of the power (e.g., battery) being supplied to the terminal and the power consumption of the antenna elements. In addition, the terminal may adjust the level of the transmission power using digital data generated based on the constellation (e.g., constellation based on QPSK) and the degree of modulation. This may be performed by a digital-to-analog converter, and the digital-to-analog converter may maximally increase the power as much as 13 dB in consideration of an information bit and an error vector magnitude (EVM) of the digital-to-analog converter.

However, in the case of controlling the power using the power amplifiers or the digital-to-analog converter as described above, it is not possible to sufficiently compensate for a path loss occurring in the signal transmission and reception process, and thus an additional control is necessary.

The terminal according to an embodiment of the disclosure can additionally adjust the level of the power through adjustment of the number of RF chains. As described above, by adjusting the number of RF chains in accordance with the power control command, the terminal according to an embodiment of the disclosure can secure a greater transmission power value in comparison with the existing method through the power amplifier and the digital-to-analog converter, and thus the path loss occurring in the signal transmission and reception process can be sufficiently compensated for.

Figure 3:
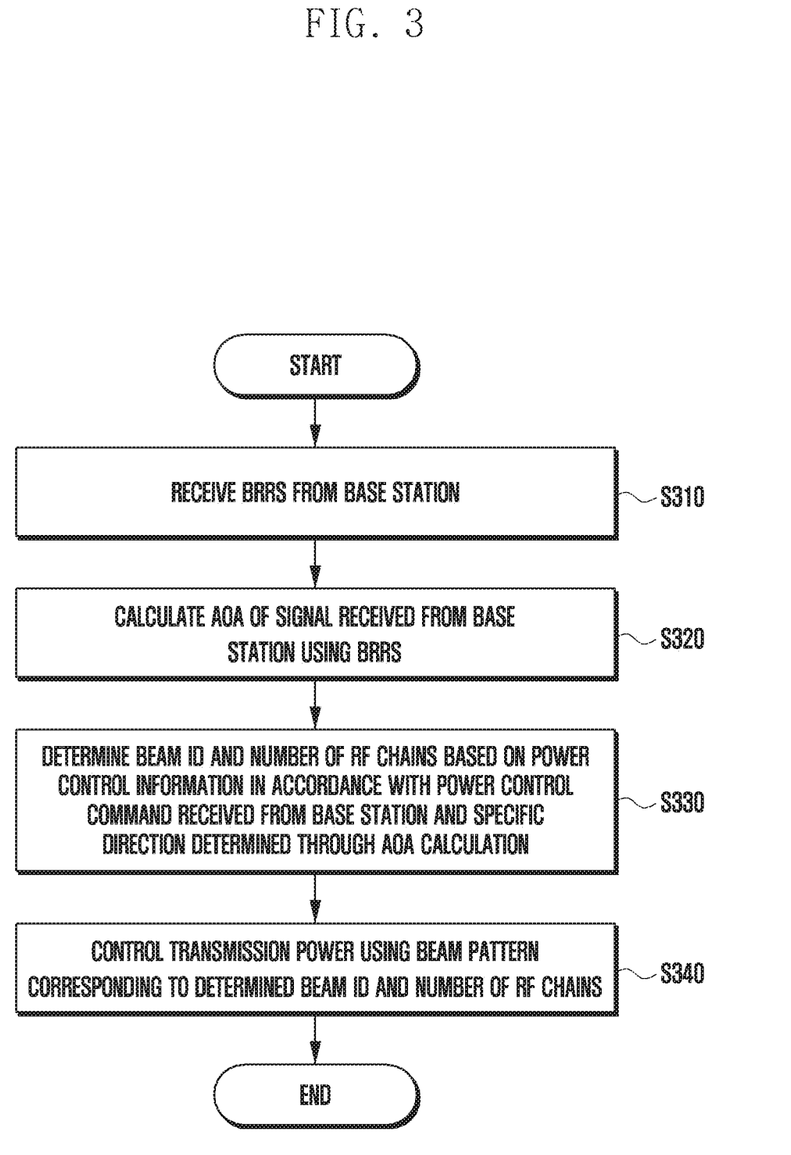
FIG. 3 is a flowchart illustrating a method for controlling a transmission power in additional consideration of direction information according to an embodiment of the disclosure.

FIG. 3 is a flowchart illustrating a method for controlling a transmission power in additional consideration of direction information according to an embodiment of the disclosure.

With reference to FIG. 3, the terminal according to an embodiment of the disclosure may receive a beam refinement reference signal (BRRS) through a transceiver (S310).

Further, the terminal having received the BRRS may calculate an angle of arrival (AoA) for a main path of the received signal based on the BRRS (S320).

That is, the terminal according to an embodiment of the disclosure may calculate the reception direction and angle of the signal received from the base station using the BRRS. In this case, the process in which the terminal according to an embodiment of the disclosure calculates the AoA through the BRRS may be performed before reception of the power control command as described above. In contrast with this, the terminal according to an embodiment of the disclosure may calculate the AoA using the BRRS after the reception of the power control command.

As described above, if the terminal according to an embodiment of the disclosure specifies the direction in which the terminal is to transmit the signal through calculation of the AoA, the terminal may determine the pattern of the beam to be transmitted to the base station based on the power control information and the specific direction.

First, the terminal according to an embodiment of the disclosure may determine the beam ID and the number of RF chains based on the power control information in accordance with the power control command and the specific direction determined by the AoA calculation (S430).

More specifically, the terminal according to an embodiment of the disclosure may search for data mapped corresponding to the power control information and the specific direction based on a second lookup table. Here, in the second lookup table, the beam IDs of the antenna elements corresponding to certain power control information and certain direction information and the number of RF chains following the beam IDs may be mapped to each other. The second lookup table will be described later in more detail with reference to FIG. 4.

If the beam IDs determined using the second lookup table and the corresponding number of RF chains are determined using the second lookup table, the terminal according to an embodiment of the disclosure may control the transmission power using the beam pattern in accordance with the determined beam ID and the number of RF chains (S340).

If a plurality of pieces of data of beam IDs and the number of RF chains mapped corresponding to the power control information and the direction information are provided in the second lookup table, the terminal according to an embodiment of the disclosure may select one of the plurality of pieces of data in consideration of other parameters. For example, the terminal according to an embodiment of the disclosure may select the data having the highest transmission efficiency in consideration of the degree of interference of the signal in communication with the base station. Further, the terminal may control the transmission power using the beam pattern following the beam ID and the number of RF chains corresponding to the selected data.

As described above, in additional consideration of the direction information in addition to the power control information, the terminal according to an embodiment of the disclosure can heighten the transmission efficiency of the signal being transmitted to the base station as well as controlling the transmission power.

Figure 4:
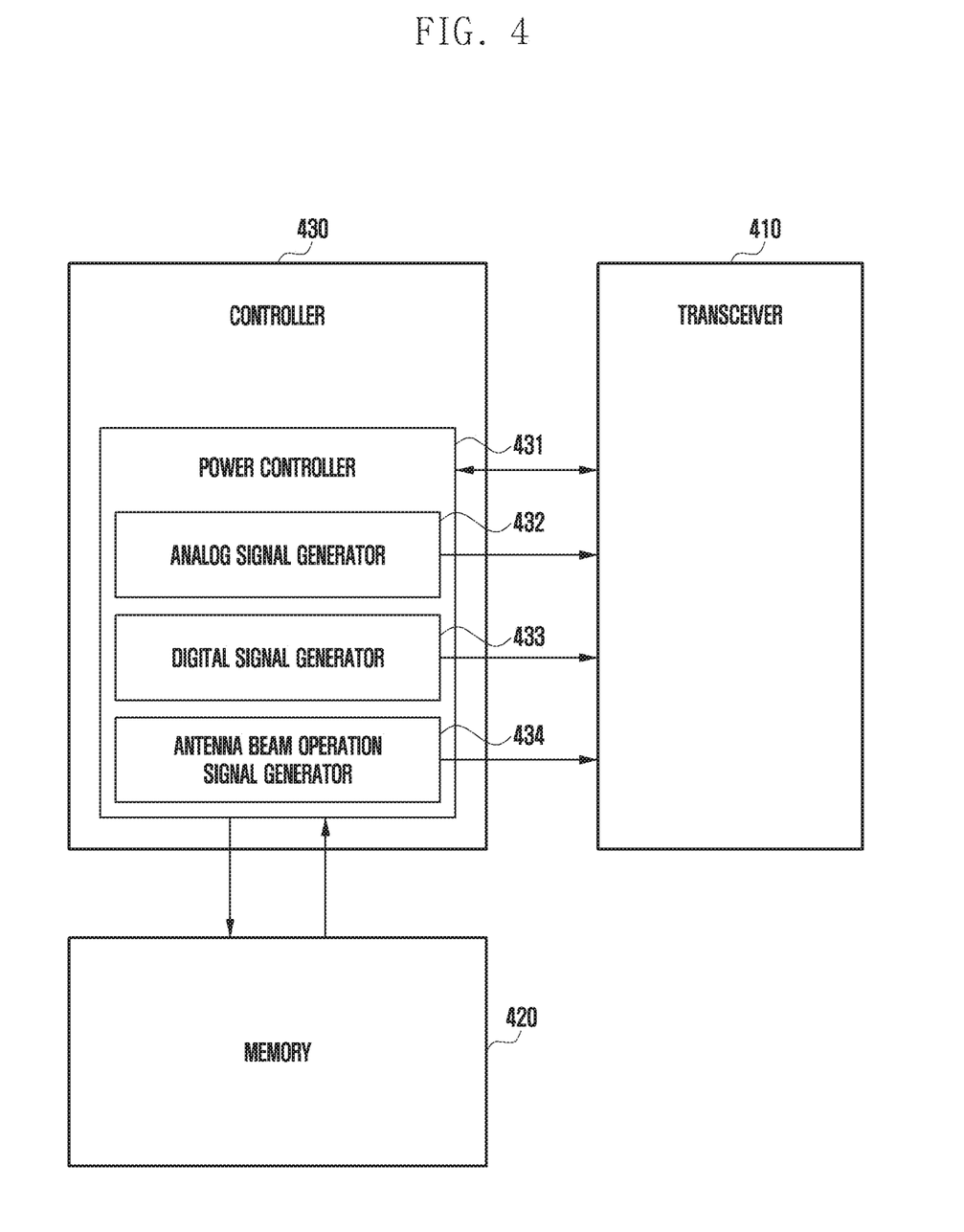
FIG. 4 is a block diagram illustrating the configuration of a terminal according to an embodiment of the disclosure.

FIG. 4 is a block diagram illustrating the configuration of a terminal according to an embodiment of the disclosure.

With reference to FIG. 4, a terminal 400 according to an embodiment of the disclosure may include a transceiver 410, a memory 420, and a controller 430.

The transceiver 410 according to an embodiment of the disclosure may receive a signal transmitted from the base station and it may transmit a signal to the base station. Further, the transceiver 410 may receive the power control command as described above with reference to FIG. 1 from the base station. Although not illustrated in the drawing, the transceiver 410 according to an embodiment of the disclosure may include an antenna array including a plurality of antenna elements. The plurality of antenna elements may transmit and receive signals, and at least parts of the plurality of antenna elements may be connected to the RF chains to receive a transferred signal. Further, although not illustrated in the drawing, the transceiver 410 according to an embodiment of the disclosure may further include a low-noise amplifier (LNA) capable of amplifying the signal received from the base station and a frequency down-converter configured to down-convert the frequency. Further, the transceiver 410 according to an embodiment of the disclosure may further include a frequency up-converter configured to up-convert the frequency and a power amplifier configured to amplify the signal in order to transmit the signal output from the controller 430 through the antenna.

The memory 420 according to an embodiment of the disclosure may store programs for controlling the transmission power of the terminal. Further, the memory 420 according to an embodiment of the disclosure may store a plurality of lookup tables used to transmit signals to the base station based on the power control information in accordance with the power control command.

As an example, the memory 420 according to an embodiment of the disclosure may include a first lookup table for generating signals for controlling the number of RF chains and the power amplifier based on the power control information. As described above, in the first lookup table, the number of RF chains and data of a power control value generated by the power amplifier may be mapped to each other based on certain power control information.

For example, the first lookup table may be in the form below.

| Transmission power value [dB] according to power control information | The number of RF chains | Power control value [dB] secured by adjustment of the number of RF chains | Power control value [dB] by PA | Power control value [dB] by DAC |
|---|---|---|---|---|
| 10 | 2 | 5 | 2 | 3 |
| ... | ... | ... | ... | ... |

That is, the first lookup table may include data in which the number of RF chains, a power control value being adjusted by the number of RF chains, a power control value being adjusted by a power amplifier, a power control value being adjusted by a digital-to-analog converter are mapped to each other corresponding to the total transmission power value determined based on certain power control information. As an example, in the first lookup table, data mapped corresponding to the final transmission power value may be diversely mapped to each other based on a terminal operation mode (mode on whether the terminal is performing a handover, the terminal is moving in a coverage area, or the terminal is in a fixed location), a priority on which one is to be preferentially considered among the power adjustment types by the number of RF chains, PA, and DAC, respectively, and a transmission efficiency.

In the first lookup table, the power control value in accordance with the adjustment of the number of RF chains may mean the transmission power value generated by PA and DAC (that are discriminated from the PA and the DAC forming the power control value by the PA and the power control value by the DAC) connected to respective antennas operating to meet the determined number of RF chains.

Further, the power control value by the PA may mean the transmission power value that is controlled only by an analog signal input to the PA, and the power control value by the DAC may mean the transmission power value that is controlled only by digital data input to the DAC. That is, the power control value by the DAC may mean the transmission power value that is generated as the analog signal output after the input of the digital data to the DAC is input to the power amplifier connected to the DAC. Here, the digital data may be digital data generated based on, for example, the constellation (e.g., constellation based on QPSK) and the degree of modulation.

The terminal according to an embodiment of the disclosure may acquire the number of RF chains mapped corresponding to the determined final transmission power value, the transmission power value that is adjustable by the adjustment of the number of RF chains, and data of the transmission power value by the PA and the transmission power value by the DAC using the first lookup table.

Further, as an example, the memory 420 according to an embodiment of the disclosure may store a second lookup table including data of a beam ID and the number of RF chains of an antenna element mapped corresponding to the power control information and the direction information. For example, the second lookup table may include data of beam IDs of all usable antenna elements and the corresponding number of RF chains in accordance with the direction information and the power control information.

As an example, the second lookup table may be in the form below.

| Power control value [dB] according to power control information | Direction information | Beam ID | The number of RF chains |
|---|---|---|---|
| 10 | A | X | 1 |
|  |  | X, Y | 2 |
|  |  | X, Y, Z | 3 |
| ... | ... | ... | ... |

As indicated in the above table, a plurality of pieces of beam ID data may be mapped with respect to one power control value and direction information. More specifically, in the second lookup table, if the power control value and the direction are determined, data of beam IDs of an antenna for transmitting a corresponding signal and the number of RF chains in accordance with the beam IDs of the antenna may be mapped to each other Further, although not included in the above table, beam patterns in accordance with respective beam IDs and the number of RF chains may be additionally included in the second lookup table. That is, information on the beam patterns that may be formed in accordance with the beam IDs and the number of RF chains mapped corresponding to specific power control information and specific direction information may be further included in the second lookup table.

If the power control command is received through the transceiver, the controller 430 according to an embodiment of the disclosure may determine the power control information through analysis of the power control command. If the power control information is determined, the controller 430 according to an embodiment of the disclosure may determine the power control value to be additionally controlled based on the power control information. Further, the controller 430 according to an embodiment of the disclosure may determine the final transmission power value that reflects the power control value determined based on the power control information.

If the level of the final transmission power is determined, the terminal may determine how many RF chains are to be driven in order to generate the final transmission power or how much dB the transmission power is to be formed by the PA. For this, the controller 430 according to an embodiment of the disclosure may control the memory to transfer the lookup table. A power controller 431 according to an embodiment of the disclosure may determine the transmission power using the lookup table transferred from the memory 420.

More specifically, the power controller 431 according to an embodiment of the disclosure may determine the number of RF chains corresponding to the power control information based on the first lookup table. For example, the power controller 431 may acquire all data of the numbers of RF chains mapped to the power control information from the first lookup table. As an example, data mapped to the power control information of 10 dB may include data on 4 RF chains and data on 8 RF chains. Further, the data on the 4 RF chains may include data for generating 10 dB only by the PA and data for generating 10 dB in total by the PA and the DAC in order to generate 10 dB. If a plurality of pieces of data are acquired in relation to one piece of power control information, the power controller 431 may select one piece of data in consideration of the current operation mode of the terminal, the level of the transmission power to be controlled, and the priority for the power control (e.g., in the case where usage of only the PA is preferentially configured).

As an example, if 4 RF chains are determined and generation of the transmission power value only by the PA is determined in controlling the power of 10 dB, the power controller 431 may control an analog signal generator 432 and an antenna beam operation signal generator 434 to generate a signal. In this case, the signal generated by the analog signal generator 432 may be a signal input to the PA in order to generate the power of 10 dB, and the signal generated by the antenna beam operation signal generator 434 may be a signal for generating the beam pattern using 4 RF chains.

In contrast with this, if 4 RF chains are determined and generation of the transmission power value using both the PA and the DAC is determined in controlling the power of 10 dB, the power controller 431 may control the analog signal generator 432, the digital signal generator 433, and the antenna beam operation signal generator 434 to generate a signal. In this case, the signal generated by the digital signal generator 433 may be a signal including digital data for generating the power control value of 10 dB together with the PA.

Further, in consideration of the direction information, the power controller 431 according to an embodiment of the disclosure may acquire the second lookup table from the memory 420. Further, the power controller 431 may acquire all data of the power control information, beam ID mapped corresponding to the power control information and the direction information, and the number of RF chains based on the second lookup table. For example, if a plurality of pieces of data of the beam IDs and the number of RF chains mapped to specific power control information and specific direction information are provided, the power controller 431 may acquire all of the plurality of pieces of data.

Further, the power controller 431 may select one piece of data that is most proper to signal transmission and reception with the base station among the plurality of pieces of data. For example, the power controller 431 may select one piece of data having the lowest degree of signal interference among the plurality of pieces of data. That is, the power controller 431 may select one piece of data capable of transmitting the signal with the highest transmission efficiency in consideration of the degree of interference of the signal, and it may determine the beam pattern in accordance with the beam ID according to the selected data and the number of RF chains.

In this case, the determined beam pattern may be in the shape having specific width and length in a specific direction in accordance with the determined number of RF chains, the power control information, and the direction information.

Further, the power controller 431 may transfer the signal including the determined beam pattern information to the transceiver 410. For example, the analog signal generator 432 and the digital signal generator 433 may transfer an analog signal and a digital signal capable of amplifying the power in accordance with the level of the transmission power to be controlled to the transceiver 410, and the antenna beam operation signal generator 434 may transfer the signal including the beam pattern information to the transceiver 410.

Figure 5A:
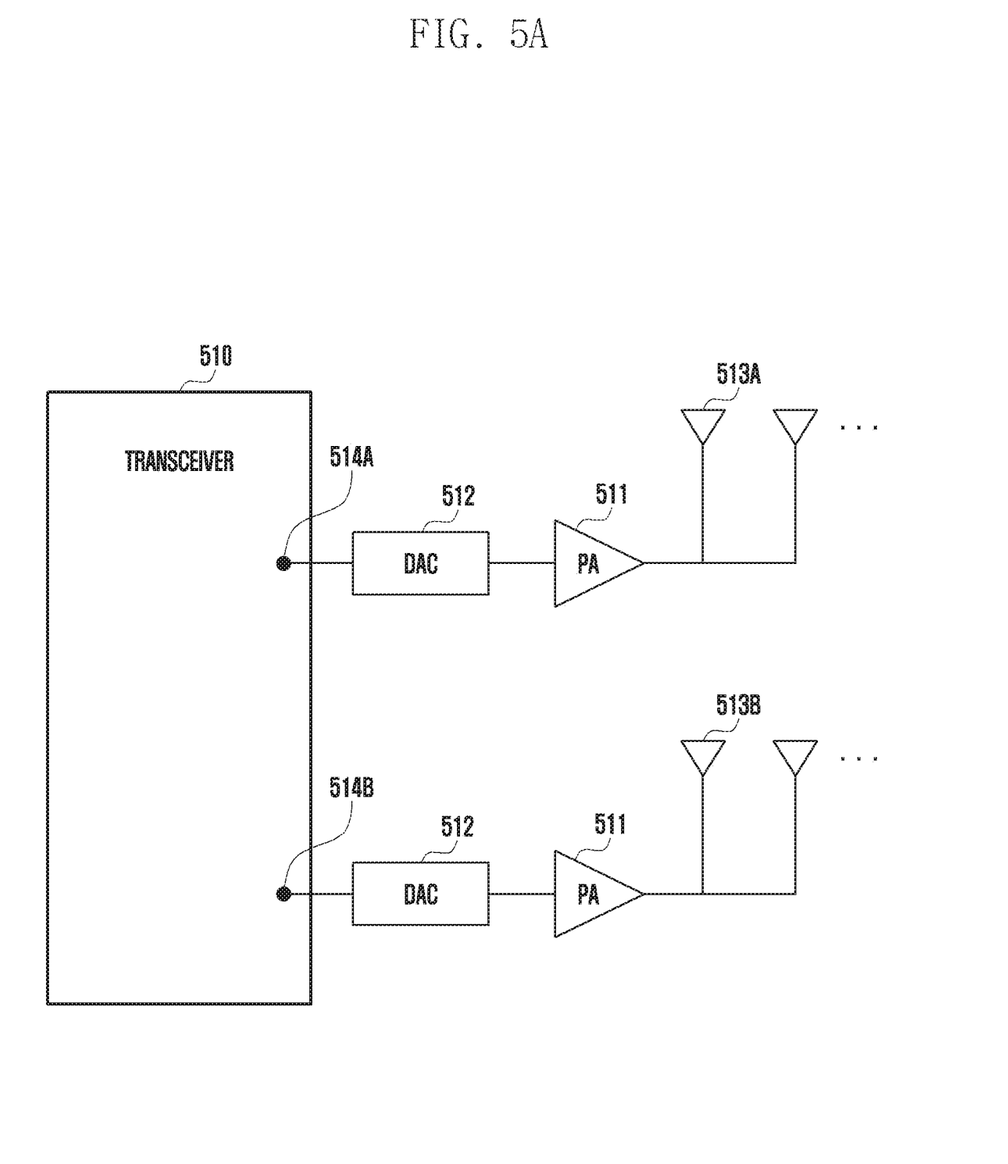
FIG. 5A is a diagram illustrating in more detail the configuration of a transceiver according to an embodiment of the disclosure.
Figure 5B:
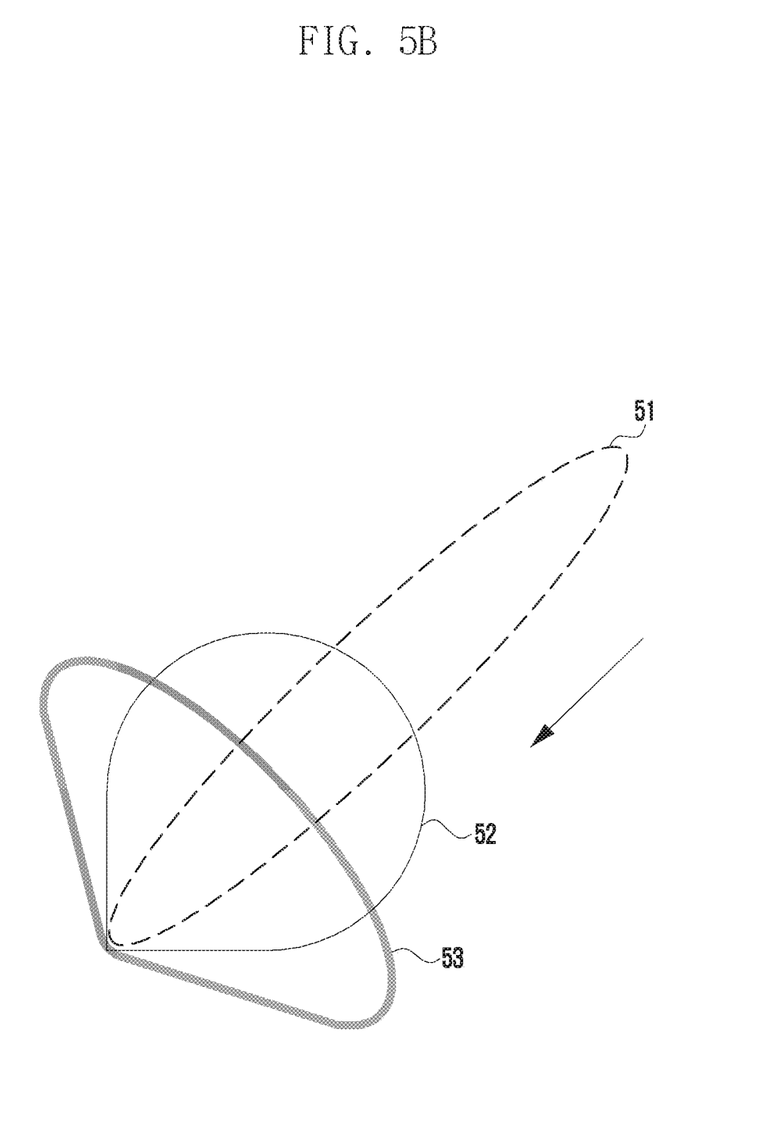
FIG. 5B is a diagram explaining a beam pattern in accordance with the number of RF chains according to an embodiment of the disclosure.

FIG. 5A is a diagram illustrating in more detail the configuration of a transceiver according to an embodiment of the disclosure, and FIG. 5B is a diagram explaining a beam pattern in accordance with the number of RF chains according to an embodiment of the disclosure.

With reference to FIG. 5A, the transceiver 510 according to an embodiment of the disclosure may include an antenna array including a plurality of antenna elements 513a and 513b. As illustrated in FIG. 5A, at least one antenna element 513a may be connected to one RF chain 514a, and the one RF chain 514a may transfer one signal stream to at least one antenna element 513a connected to the one RF chain 514a. In FIG. 5A, an example in which a plurality of antenna elements are connected to the one RF chain 514a is illustrated, but the number of antenna elements connected to the one RF chain 514a is not limited thereto, and one RF chain may be connected to one antenna element.

Meanwhile, according to an embodiment of the disclosure, the level of the transmission power capable of being controlled may differ depending on the number of RF chains being operated. In this case, the shapes of beams output from the antenna elements connected to the RF chain being operated may be displayed in graph with different beam widths and beam pattern gains in accordance with the number of RF chains. With reference to FIG. 5B, it can be seen that the number of RF chains being operated is reduced as going in an arrow direction, and as the number of RF chains is reduced, the beam width becomes widened, and the beam pattern gain (corresponding to the length of the beam in the drawing) is reduced. For example, it can be known that the beam shape 52 in the case where the number of RF chains being operated is 16 is wider than the beam shape 51 in the case where the number of RF chains being operated is 32, and the beam shape 53 in the case where the number of RF chains being operated is 8 has the widest beam width.

As described above, because the beam pattern differs as the number of RF chains being operated differs, the terminal according to an embodiment of the disclosure may control the level of the transmission power using beams having diverse shapes.

With reference to FIG. 5A again, power amplifiers 511 for amplifying the power may be respectively included in paths in which signals are transferred to the antenna elements through the RF chains 514a and 514b. Although FIG. 5A illustrates a case where only one power amplifier is connected to antenna elements connected to one RF chain, but the number of power amplifiers is not limited thereto, and a plurality of power amplifiers having different gains may be connected. If the analog signal is transferred from the analog signal generator as described above, the power amplifier 511 according to an embodiment of the disclosure may amplify the power in accordance with the analog signal.

Further, with reference to FIG. 5A, a digital-to-analog converter (DAC) 312 may be included between the RF chain 514a and the antenna element 513a. For example, if the signal including the digital data according to an embodiment of the disclosure is transferred, the DAC 512 may output the analog signal for generating a power value corresponding to the digital data. As a more detailed example, if it is determined to control the power value as high as 10 dB, the digital signal generator may transfer the signal including the digital data corresponding to 10 dB to the DAC 512. In this case, the DAC 512 may convert the digital data included in the signal transferred from the digital signal generator into an analog signal to output a corresponding power.

Further, as illustrated in FIG. 5A, an RF chain connected to at least one antenna element may be included. The antenna beam operation signal generator according to an embodiment of the disclosure may transfer the signal including beam pattern information determined by at least one of the number of RF chains and the beam ID to the transceiver.

It can be understood to those of ordinary skill in the art to which the disclosure pertains that the disclosure can be embodied in different specific types without changing the technical idea or essential features of the disclosure. Accordingly, it should be understood that the above-described embodiments are exemplary in all aspects and are not limited. The scope of the disclosure is represented by claims to be described later rather than the detailed description thereof, and it should be analogized that all changes or modifications derived from the meaning and the scope of the claims and their equivalent concept are included in the claims.

Although preferred embodiments of the disclosure have been described in the specification and drawings and specific wordings have been used, these are merely used as general meanings to assist those of ordinary skill in the art to gain a comprehensive understanding of the disclosure and do not limit the scope of the disclosure. It will be apparent to those of ordinary skill in the art to which the disclosure pertains that various modifications are possible based on the technical concept of the disclosure in addition to the embodiments disclosed herein.

The invention claimed is:

1. A method by a terminal for controlling a transmission power for performing wireless communication, the method comprising:
   receiving a message including power control information from a base station;
   identifying the power control information included in the message received from the base station, in response to receiving the message from the base station;
   determining a number of radio frequency (RF) chains corresponding to the power control information included in the message received from the base station;
   controlling the transmission power based on the determined number of RF chains; and
   transmitting, to the base station, a first signal in accordance with the controlled transmission power, based on a beam pattern in accordance with the determined number of RF chains.

2. The method of claim 1,
   wherein controlling the transmission power further comprises determining the number of RF chains based on a first lookup table, and
   wherein the first lookup table includes information in which the number of RF chains and a power control value being controlled in accordance with the number of RF chains are mapped to each other corresponding to a transmission power value in accordance with certain power control information.

3. The method of claim 1, further comprising:
   receiving a beam refinement reference signal (BRRS) from the base station;
   calculating an angle of arrival (AoA) for a second signal received from the base station using the BRRS; and
   determining a direction in which the first signal is to be transmitted to the base station in accordance with the calculated AoA.

4. The method of claim 3, wherein the number of RF chains is determined based on the direction together with the power control information.

5. The method of claim 4, wherein controlling the transmission power further comprises:
   determining a beam identification (ID) and the number of RF chains corresponding to the power control information and the direction using a second lookup table, wherein the second lookup table includes data of the beam ID and the number of RF chains of an antenna element mapped corresponding to certain power control information and certain direction information; and
   controlling the transmission power using the beam pattern corresponding to the determined beam ID and the determined number of RF chains.

6. The method of claim 5, further comprising selecting data having a high transmission efficiency among a plurality of pieces of data of beam IDs and the number of RF chains corresponding to the power control information and the direction based on a degree of interference during communication with the base station in case that the plurality of pieces of data are provided in the second lookup table.

7. A terminal to control a transmission power for performing wireless communication, the terminal comprising:
   a transceiver configured to receive a message including power control information from a base station; and
   a controller configured to:
      identify the power control information included in the message received from the base station, in response to receiving the message from the base station,
      determine a number of radio frequency (RF) chains required for power control based on the power control information corresponding to the power control information included in the message received from the base station, control the transmission power based on the determined number of RF chains, and
      transmit a first signal in accordance with the controlled transmission power, based on a beam pattern in accordance with the determined number of RF chains to the base station.

8. The terminal of claim 7,
   wherein the controller is configured to determine the number of RF chains based on a first lookup table, and
   wherein the first lookup table includes information in which the number of RF chains and a power control value being controlled in accordance with the number of RF chains are mapped to each other corresponding to a transmission power value in accordance with certain power control information.

9. The terminal of claim 7,
   wherein the transceiver is configured to receive a beam refinement reference signal (BRRS) from the base station, and
   wherein the controller is configured to:
      calculate an angle of arrival (AoA) for a second signal received from the base station using the BRRS, and
      determine a direction in which the first signal is to be transmitted to the base station in accordance with the calculated AoA.

10. The terminal of claim 9, wherein the controller is configured to determine the number of RF chains based on the direction together with the power control information.

11. The terminal of claim 10,
   wherein the controller is configured to:
      determine a beam identification (ID) and the number of RF chains corresponding to the power control information and the direction using a second lookup table, and
      control the transmission power using the beam pattern corresponding to the determined beam ID and the determined number of RF chains, and
   wherein the second lookup table includes data of the beam ID and the number of RF chains of an antenna element mapped corresponding to certain power control information and certain direction information.

12. The terminal of claim 11, wherein the controller is configured to select data having a high transmission efficiency among a plurality of pieces of data of beam IDs and the number of RF chains corresponding to the power control information and the direction based on a degree of interference during communication with the base station in case that the plurality of pieces of data are provided in the second lookup table.

* * * * *